US006670625B1

(12) United States Patent
Rand et al.

(10) Patent No.: US 6,670,625 B1
(45) Date of Patent: Dec. 30, 2003

(54) METHOD AND APPARATUS FOR CORRECTING MULTIPOLE ABERRATIONS OF AN ELECTRON BEAM IN AN EBT SCANNER

(75) Inventors: Roy E. Rand, Palo Alto, CA (US); Khem Garewal, Palo Alto, CA (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/064,174

(22) Filed: Jun. 18, 2002

(51) Int. Cl.[7] ................................................ G01N 23/00
(52) U.S. Cl. ............................ 250/492.3; 250/390 ML; 250/396 M; 250/398; 250/396 R; 378/138; 378/4; 378/137; 378/121; 378/13; 378/119; 378/131; 378/10; 378/12
(58) Field of Search ...................... 250/492.3, 396 ML, 250/396 M, 398, 396 R; 378/138, 4, 137, 121, 13, 119, 131, 10, 12

(56) References Cited

U.S. PATENT DOCUMENTS 4,352,021 A 9/1982 Boyd et al.
4,521,900 A 6/1985 Rand
4,521,901 A 6/1985 Rand
4,625,150 A 11/1986 Rand
4,644,168 A 2/1987 Rand et al.
5,193,105 A 3/1993 Rand et al.
5,289,519 A 2/1994 Rand
5,336,891 A * 8/1994 Crewe .................... 250/396 R
5,386,445 A 1/1995 Rand
5,654,995 A * 8/1997 Flohr .......................... 378/10
5,719,914 A * 2/1998 Rand et al. .................... 378/4
5,905,809 A * 5/1999 Timmer ...................... 382/131
6,208,711 B1 3/2001 Rand et al.

* cited by examiner

*Primary Examiner*—John R. Lee
*Assistant Examiner*—Zia R. Hashmi
(74) *Attorney, Agent, or Firm*—McAndrews, Held & Malloy, Ltd.; Peter J. Vogel; Michael A. Dellap una

(57) ABSTRACT

A method and apparatus are disclosed for reducing variation in a spot size of an electron beam at a target due to multipole aberrations in an electron beam tomography (EBT) scanner. A magnitude of a DC voltage applied to a positive ion electrode (PIE) within the EBT scanner is adjusted and an orientation of a non-circular aperture of the PIE is aligned with respect to the electron beam. A profile of the spot size is monitored while adjusting the magnitude of the DC voltage and while aligning the orientation of the non-circular aperture of the PIE until the variation in the spot size is sufficiently reduced.

20 Claims, 8 Drawing Sheets

PARABOLOIDAL SURFACE

DECAPOLE PIE ELECTRODE

FLUTED PARABOLOIDAL SURFACE
(Decapole)

METHOD AND APPARATUS FOR CORRECTING MULTIPOLE ABERRATIONS OF AN ELECTRON BEAM IN AN EBT SCANNER

BACKGROUND OF INVENTION

Certain embodiments of the present invention relate to an electron beam tomography (EBT) scanner. More particularly, certain embodiments relate to a method and apparatus for reducing variation in a spot size of an electron beam at a target due to multipole aberrations in an electron beam tomography (EBT) scanner.

EBT scanners are generally described in U.S. Pat. No. 4,352,021 to Boyd, et al. (Sep. 28, 1982), and U.S. Pat. No. 4,521,900 (Jun. 4, 1985), U.S. Pat. No. 4,521,901 (Jun. 4, 1985), U.S. Pat. No. 4,625,150 (Nov. 25, 1986), U.S. Pat. No. 4,644,168 (Feb. 17, 1987), U.S. Pat. No. 5,193,105 (Mar. 9, 1993), U.S. Pat. No. 5,289,519 (Feb. 22, 1994), U.S. Pat. No. 5,719,914 (Feb. 17, 1998) and U.S. Pat. No. 6,208,711 all to Rand, et al. Applicants refer to and incorporate herein by reference each above listed patent to Rand, et al.

As described in the above-referenced Rand et al. patents, an electron beam is produced by an electron gun at the upstream end of an evacuated, generally conical shaped housing chamber. A large negative potential (e.g. 130 kV or 140 kV) on the electron gun cathode accelerates the electron beam downstream along the chamber axis. Further downstream, a beam optical system that includes magnetic focusing, quadrupole, and deflection coils focuses and deflects the beam to scan along an X-ray producing target. The final beam spot at the X-ray producing target is smaller than that produced at the electron gun, and must be suitably sharp and free of aberrations so as not to degrade definition in the image rendered by the scanner.

The X-rays produced by the target penetrate a patient or other object and are detected by an array of detectors. The detector array, like the target, is coaxial with and defines a plane orthogonal to the scanner axis of symmetry. The output from the detector array is digitized, stored, and computer processed to produce a reconstructed X-ray video image of a portion of the object, typically an image of a patient's anatomy.

In the chamber region upstream of the beam optical system, a diverging beam is desired and the electron beam may advantageously self-expand due to the force created by its own space-charge. By contrast, downstream from the beam optical system, a converging, self-focusing beam is desired to minimize the final beam spot at the X-ray producing target.

As the electron beam passes through the vacuum chamber, it ionizes residual or introduced gas therein, producing positive ions. The positive ions are useful in the downstream chamber region where space-charge neutralization and a converging beam are desired. But in the upstream region, unless removed by an external electrostatic field, the positive ions are trapped in the negative electron beam. The space-charge needed for the desired beam self-expansion may undesirably be neutralized, and the beam may even destabilize or collapse.

As described in U.S. Pat. Nos. 4,625,150, 5,193,105, and 5,289,519, the positive ions may be removed from the beam using a device that creates transverse electric fields and electric fields alternating in direction along the axis in the region between the electron gun and the beam-optical lens system (magnetic solenoid). Such a device is often referred to as an ion clearing electrode (ICE).

Using such transverse and/or alternating axial electric fields to remove positive ions between the electron gun and the beam optical lens system advantageously produces an electron beam that is self-repulsive (or self-defocusing) in the upstream or first region. The beam is self-attractive (or self-focusing) in the downstream or second region since ions are not removed here.

The first and second regions are traditionally segregated by a washer-shaped positive ion electrode (PIE), typically coupled to a high positive potential, e.g. up to +2.5 kV, as disclosed in U.S. Pat. Nos. 5,193,105, 5,289,419, and 5,386,445. The magnitude of the PIE potential may be used to determine the relative lengths of the upstream and downstream beam regions. Further, a suitably high PIE potential prevents ions created downstream from drifting into the upstream region.

All current EBT scanners incorporate some form of ICE terminated by a PIE or ion trap which prevents ions formed downstream of the ICE from drifting upstream. The ions are required to accumulate in the downstream beam in order to neutralize the downstream space-charge. The PIE causes a well-defined paraboloidal boundary to form between the space-charge-dominated beam in the ICE and the neutralized beam downstream. The paraboloidal boundary may be used to correct spherical aberration (focal strength varying with radius) in the beam self-focusing forces by varying the voltage applied to the PIE (see U.S. Pat. No. 5,719,914).

There are other non-linearities or aberrations in the electron beam focusing forces that cause imperfect final beam spots and which are known as multipole aberrations. In multipole aberrations, the focal strength varies with azimuthal angle as well as radius. The multipole aberrations are due to non-linear external forces applied to the beam by the electrodes, and residual ion clouds in the ICE system. In certain ICE systems such as the SPICE (U.S. Pat. No. 6,208,711), RICE (U.S. Pat. No. 5,193,105), and RICE-NOODLE (U.S. Pat. No. 5,289,519) systems, the predominant multipole aberration is the decapole in which the focusing forces have 5-fold symmetry. The 5-fold symmetry typically causes a variation of the beam spot width around the X-ray target with a period of 72 degrees.

A need exists to compensate for and reduce multipole aberrations of an electron beam in an EBT scanner in order to reduce variation in spot size at a target. More particularly, a need exists to compensate for and reduce the predominant decapole aberration.

SUMMARY OF INVENTION

An embodiment of the present invention provides an approach for reducing the effects of multipole aberrations in an electron beam of an EBT scanner.

A method is provided for reducing variation in a spot size of an electron beam at a target due to multipole aberrations in an electron beam tomography (EBT) scanner. A magnitude of a DC voltage is applied to a positive ion electrode (PIE) within the EBT scanner and is adjusted. An orientation of a non-circular aperture of the PIE is aligned with respect to the electron beam. A profile of the spot size is monitored while adjusting the magnitude of the DC voltage and while aligning the orientation of the non-circular aperture of the PIE until the variation in the spot size is sufficiently reduced.

Apparatus is also provided for reducing variation in a spot size of an electron beam at a target due to multipole aberrations. The apparatus includes a positive ion electrode (PIE) having a non-circular aperture specifically oriented with respect to the electron beam and a variable DC voltage source to apply a magnitude of DC voltage to the PIE. The PIE comprises a planar disk where the non-circular aperture is sized to permit passage of the electron beam through the aperture. The magnitude of the DC voltage, the aperture, and the alignment of the aperture with respect to the electron beam all serve to reduce variation in the spot size of the electron beam at the target.

Certain embodiments of the present invention afford an approach to reduce variation in the spot size of an electron beam of an EBT scanner due to multipole aberrations caused by the beam self-focusing forces.

The foregoing summary, as well as the following detailed description of certain embodiments of the present invention, will be better understood when read in conjunction with the appended drawings. It should be understood, however, that the present invention is not limited to the arrangements and instrumentality shown in the attached drawings.

DETAILED DESCRIPTION

Figure 1:
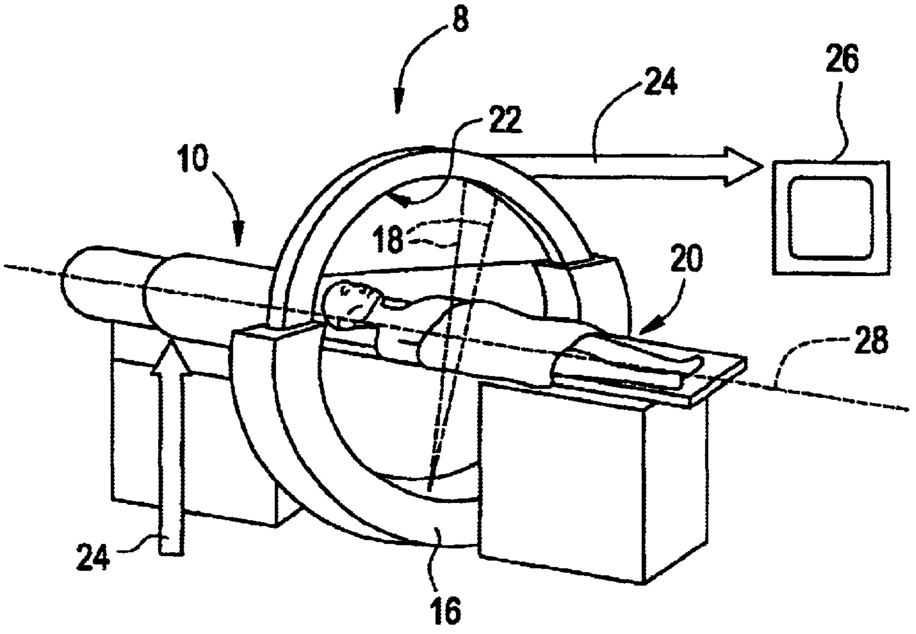
FIG. 1 is an illustration of a typical EBT scanner system that is used in accordance with an embodiment of the present invention.
Figure 2:
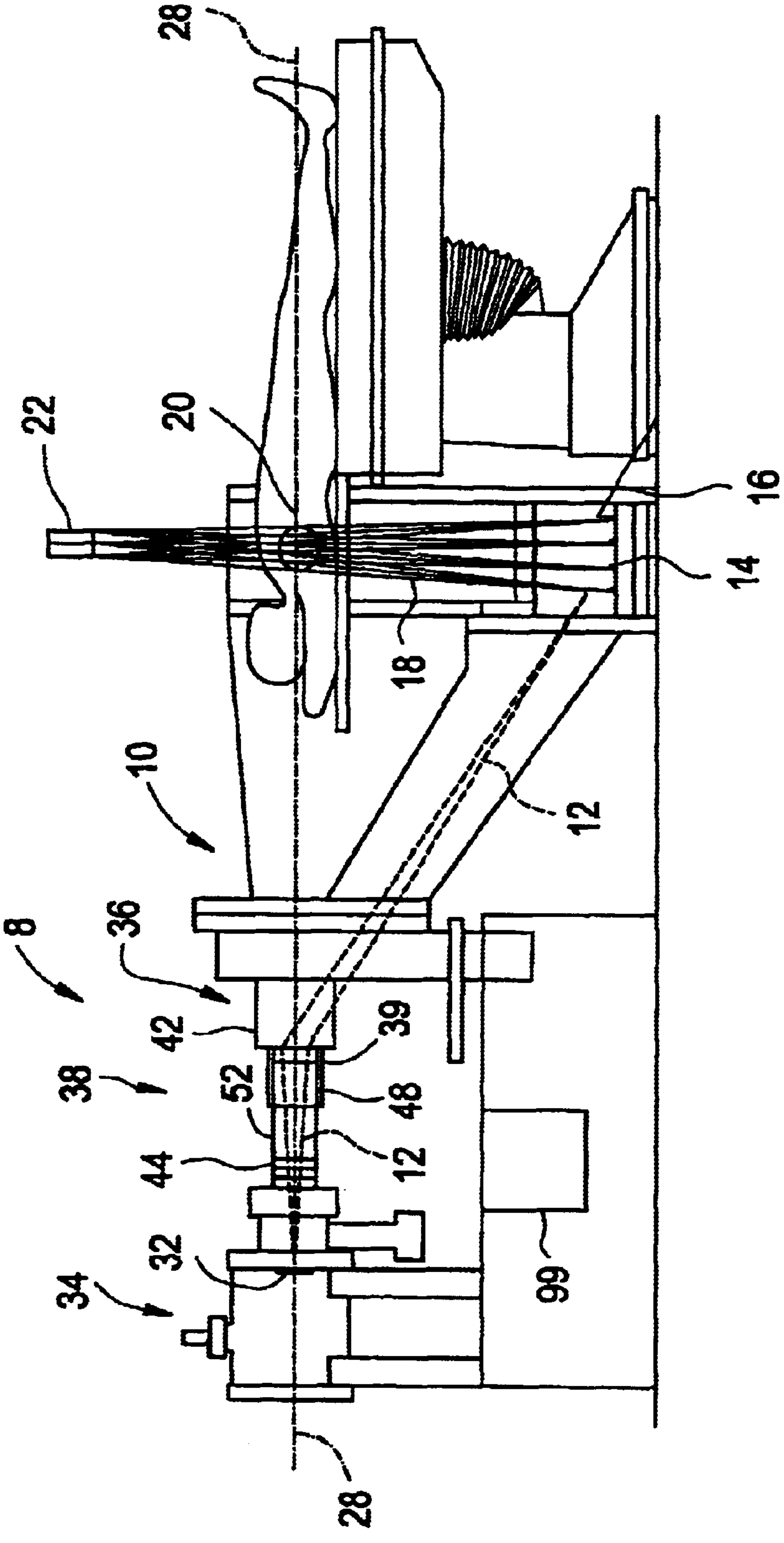
FIG. 2 is a more detailed illustration of the EBT scanner system of FIG. 1 showing how an electron beam traverses through the system in accordance with an embodiment of the present invention.

Before describing certain embodiments of the present invention, it is helpful to understand the operation of an EBT scanner. FIG. 1 and FIG. 2 illustrate such a generalized system 8, in which multipole aberration is to be reduced if not eliminated, according to certain embodiments of the present invention. System 8 includes a vacuum chamber housing 10 in which an electron beam 12 is generated at the cathode of an electron gun 32 located in upstream region 34, in response to perhaps 130 kV high voltage. The electron beam is then caused by optical system 38, including magnetic lens 39 and deflection coil 42, to scan at least one circular target 14 located within a front lower portion 16 of housing 10.

When scanned by the focused electron beam 12, the target 14 emits a moving fan-like beam of X-rays 18. X-rays 18 then pass through a region of a subject 20 (e.g. a patient or other object) and register upon a detector array 22 located diametrically opposite. The detector array outputs data to a computer system (indicated by arrows 24 in FIG. 1) that processes and records the data, producing an image of a slice of the subject on a video monitor 26. As indicated by the second arrow 24, the computer system also controls the system 8 and the electron beam production therein.

Gases in housing 10 produce positive ions in the presence of the electron beam 12. Positive ions are beneficial in the downstream, self-focusing region 36, but should be removed (or at least be suitably controlled) in the upstream, self-expanding de-focusing region 34.

Beam optical system 38 is mounted outside and within housing 10 and includes magnetic lens 39, deflecting coils and quadrupole coils (collectively coils 42), and an electrode assembly 44. Coils 39 and 42 contribute a focusing effect to help shape the final beam spot as it scans one of the targets 14. Electrode assembly 44 controls positive ions in the upstream region.

Electrode assembly 44 is mounted within housing 10 between the electron gun 32 and the beam optical assembly 38 such that the electron beam 12 passes axially through assembly 44 along the z-axis 28. Ideally, the z-axis 28 is coaxial with the electron beam 12 upstream from the beam optics assembly 38 within chamber 10. Axis 28 also represents the longitudinal axis of chamber 10, and the axis of symmetry for the electrode assembly 44 and the beam optics assembly 38.

Figure 3:
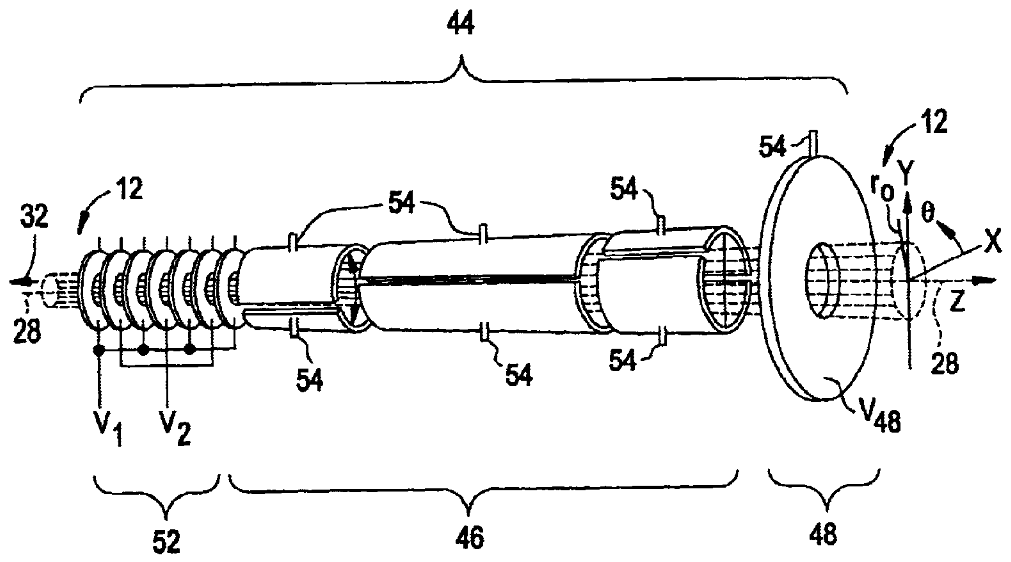
FIG. 3 is a detailed illustration of a typical electrode assembly of the EBT scanner of FIGS. 1 and 2 having a circular PIE aperture.

Referring to FIG. 3, electrode assembly 44 may include an ion clearing electrode 46 (ICE), a positive ion electrode 48 (PIE), and a periodic axial field ion controlling electrode 52 (PICE). The various PICE, ICE, and PIE electrodes are mounted within housing 10 between the electron gun 32 and coils 39 and 42 such that the electron beam 12 passes axially therethrough about axis 28. The various PIE, ICE, and PICE elements comprising assembly 44 are preferably stainless steel, copper, or other material that does not outgas into chamber 10. The elements are mounted within chamber 10 using insulated standoffs 54 and are coupled to potential sources to produce electric fields.

The PIE produces an axial field that prevents positive ions from migrating upstream, which migration would interfere with the production of a sharply self-focused beam spot at the X-ray target. PIE 48 also sharply defines the interface between the upstream region and the downstream region.

PIE 48 segregates the upstream region (i.e. the beam expanding or de-focusing region) from the downstream region (i.e. the beam converging or self-focusing region). Because positive ions exist downstream from PIE 48 (e.g. to the right in FIG. 3), the electron space-charge is neutralized and the beam will converge or self-focus toward axis 28 due to the beam's self-magnetic field. The magnitude of the self-focusing force will vary along axis 28 as a function of the beam diameter and the current density, which produces the self-magnetic field.

Upstream (e.g. to the left) from PIE 48, positive ions are removed by electrode assembly 44, permitting the electron beam 12 to expand or de-focus due to space-charge of the electrons within the beam. The magnitude of the de-focusing force at various points along axis 28 will vary with the beam diameter and space-charge density.

Figure 4:
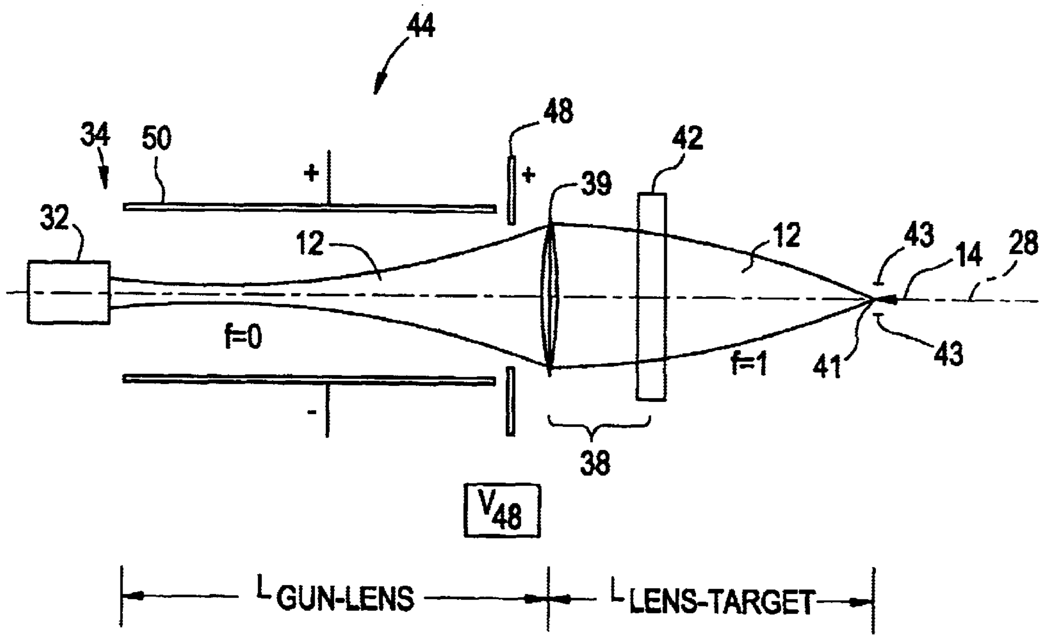
FIG. 4 illustrates the electron beam focusing accomplished by the scanner of FIG. 1 in accordance with an embodiment of the present invention.

Referring to FIG. 4, in the upstream region, denoted f=0, ICE 50 sweeps away positive ions and allows the electron beam 12 to self-expand. The expanded beam passes through PIE 48, and into the beam-optical system 38, more specifically, through a magnetic lens 39 and deflection coils 42. Downstream, (e.g. to the right) of PIE 48, denoted f=1, the electron beam 12 self-focuses (aided by the beam-optical system 38) to form a final beam spot 41on a portion of the X-ray emitting target 14. Shown symbolically as 43, but for certain embodiments of the present invention, the final beam 41 may vary in width due to multipole aberrations.

Figure 5:
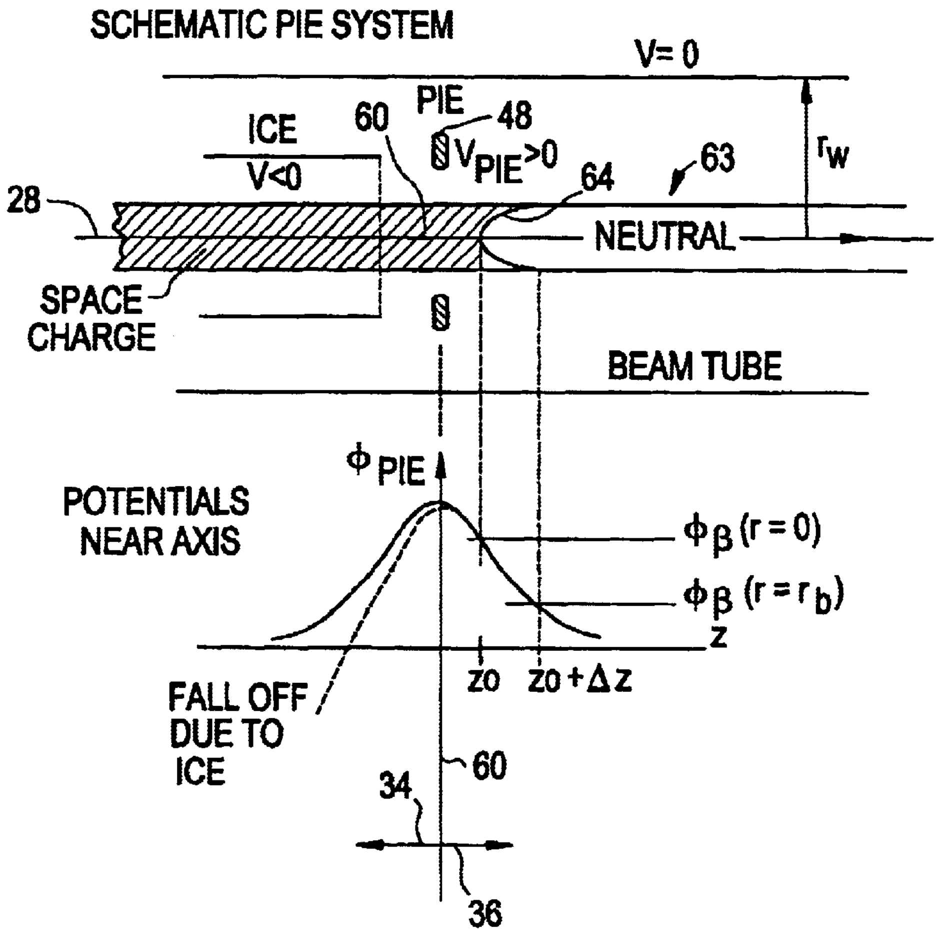
FIG. 5 illustrates the typical paraboloidal boundary that is created between two regions of the electron beam generated by the scanner in FIG. 1 using the circular PIE aperture shown in FIG. 3.

As shown in FIG. 5, the potential along the electron beam peaks at the axial position of the PIE center 60. Upstream 34 of the PIE 48, the potential drops rapidly to the average negative potential inside the ICE. Positive ions formed in the electron beam in the upstream region are accelerated rapidly further upstream to be removed from the beam by the ICE. Immediately downstream 36 from the PIE 48 the potential also drops rapidly towards the potential of the neutralized beam region 63. In the neutralized beam region 63, the neutralization of the beam itself is in equilibrium at a value slightly greater than unity, with the rate of electron-caused ion production being equal to the rate of loss of ions by radial flow.

Figure 6:
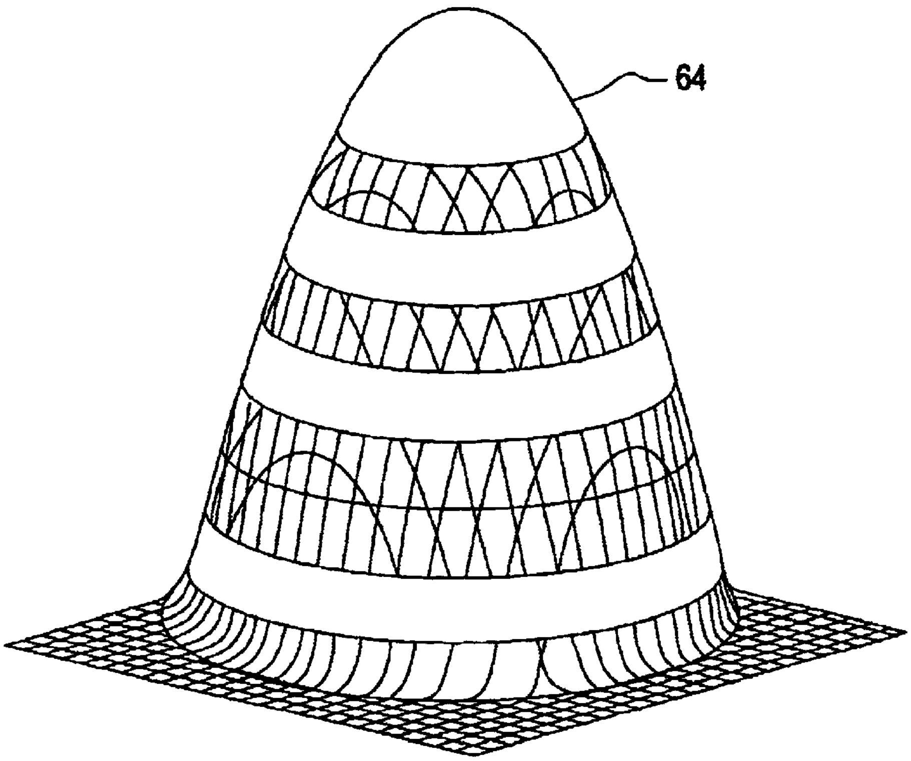
FIG. 6 illustrates a surface of the paraboloidal boundary of FIG. 5.

Thus, there is a region of approximately zero neutralization (f=0) and a region of approximately unity neutralization (f=1). The boundary between the two regions is, to a first approximation, a paraboloid 64. The boundary configuration arises because the potential within the beam due to the (uniform) non-neutralized beam forms a parabolic trough in the radial dimension, superimposed on the potential due to the PIE 48. The parabolic potential trough intersects with the almost uniform potential of the neutralized beam, producing a paraboloidal boundary 64 of the neutralized region 63 (see FIG. 6).

As previously discussed, other non-linearities or aberrations in the electron beam self-focusing forces cause imperfect final beam spots. The non-linearities are known as multipole aberrations. The focal strength varies with azimuthal angle as well as radius of the beam.

In an embodiment of the present invention, the PIE applied potential (positive DC voltage) and the shape of the aperture 70 (see FIG. 7) of the PIE 48 which the electron beam traverses, are modified to correct for the effects of the multipole aberrations, namely variation in spot size at the target. An adjustable DC voltage source may be used to apply the positive DC voltage to the PIE.

Figure 7:
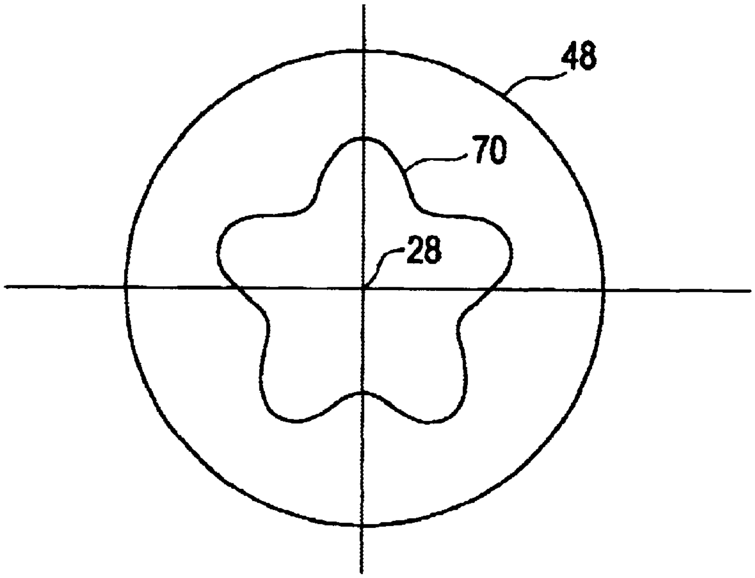
FIG. 7 illustrates a PIE with a non-circular aperture used in the scanner of FIG. 1 in accordance with an embodiment of the present invention.
Figure 8:
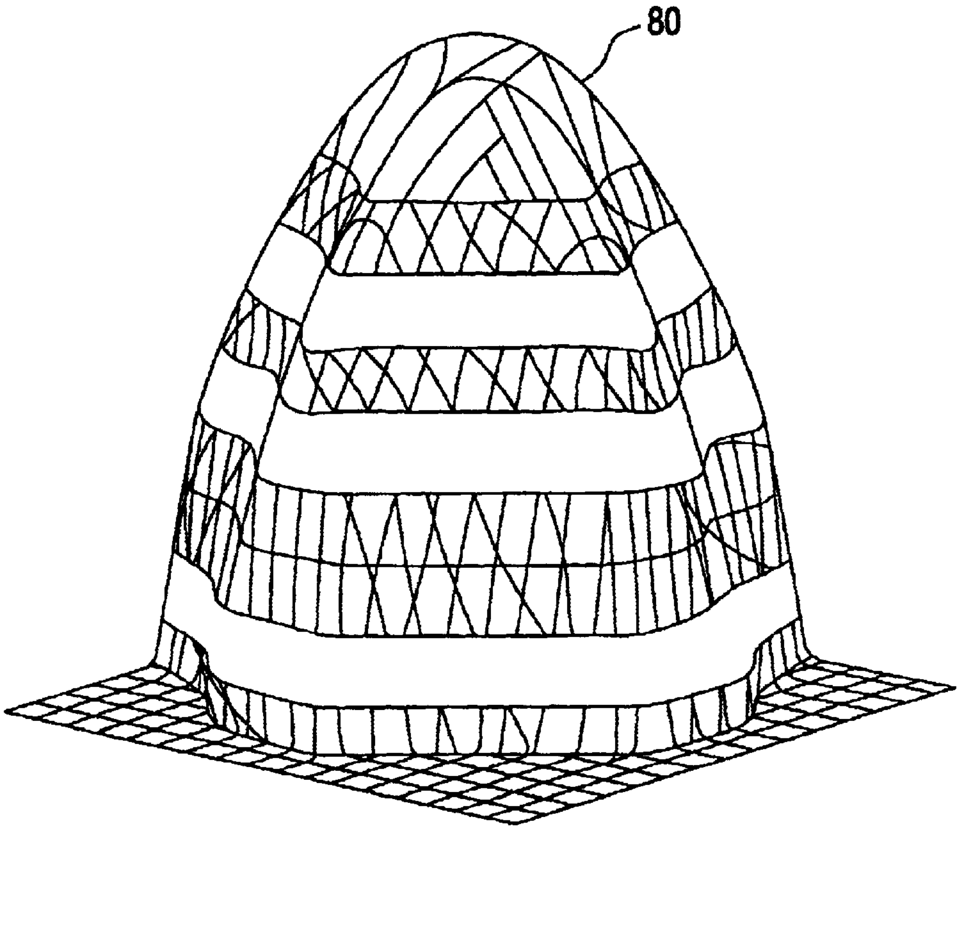
FIG. 8 illustrates a fluted paraboloidal surface that is created between two regions of the electron beam generated by the scanner of FIG. 1 using the PIE of FIG. 7 in accordance with an embodiment of the present invention.

In an embodiment of the present invention, the aperture 70 of the PIE 48 is made non-circular as, for example, as is shown in FIG. 7. For instance, to cancel the decapole aberration, the aperture should have 5-fold symmetry which may be in the form of sine wave-like peaks and troughs distributed evenly around the perimeter of the aperture as shown in FIG. 7. The effect of n-fold symmetry (where n is an integer value) in the PIE aperture is to impose on the paraboloidal boundary surface 64 between the space-charged and neutralized beams, a three-dimensional azimuthal fluting 80 with n-fold symmetry (e.g. as seen in FIG. 8). Therefore, the extent of the space-charge in the beam varies with azimuthal angle so that the non-linear self-focusing forces have a similar variation. Adjustment of the amplitude of the peaks and troughs of the aperture, as well as the aperture orientation, may cause cancellation of any amount of multipole aberration at any orientation.

In an embodiment of the present invention, the non-circular aperture 70 of the PIE 48 is designed and oriented, with respect to the electron beam 12, to reduce and/or cancel multipole aberrations, and the magnitude of the DC voltage applied to the PIE 48 is adjusted to reduce and/or cancel multipole aberrations. Typically, the magnitude of the DC voltage applied to the PIE is between +300 volts and +2000 volts in order reduce and/or completely cancel multipole aberrations and is supplied by an adjustable DC voltage source 99 as shown in FIG. 2. A profile of the spot size of the electron beam 12 at the target 14 is monitored while adjusting the orientation of the aperture 70 and while adjusting the magnitude of the DC voltage level until the variation in the spot size is reduced to an acceptable level.

As an alternative, other aperture configurations may be used to cancel the decapole aberration. For example, an aperture having five square teeth distributed evenly around the perimeter of the aperture may be used. Also, a regular geometric shape such as a pentagon may be used. Other complex shapes may be used to cancel various combinations of multipole aberrations.

In summary, the advantages and features include, among others, an approach for reducing the effects of multipole aberrations in an electron beam of an EBT scanner by applying a predetermined positive DC voltage to a PIE having a non-circular aperture.

The non-circular aperture is shaped and oriented to reduce and/or cancel multipole aberrations of an electron beam of an EBT scanner to reduce variation in spot size of the electron beam.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method to reduce variation in a spot size of an electron beam at a target due to multipole aberrations in an electron beam tomography (EBT) scanner, said method comprising:

adjusting a magnitude of a DC voltage applied to a positive ion electrode (PIE) within said EBT scanner, wherein said PIE comprises a non-circular aperture; and aligning an orientation of said non-circular aperture of said PIE with respect to said electron beam.

2. The method of claim 1 further comprising monitoring a profile of said spot size while adjusting said magnitude of said DC voltage.

3. The method of claim 1 further comprising monitoring a profile of said spot size while aligning said orientation of said non-circular aperture.

4. The method of claim 1 further comprising predetermining a shape of said non-circular aperture such that said predetermined shape reduces said variation due to at least one multipole aberration of said multipole aberrations.

5. The method of claim 1 wherein said non-circular aperture comprises a shape having n-fold symmetry such that n comprises an integer value.

6. The method of claim 1 wherein said non-circular aperture comprises a shape having 5-fold symmetry to reduce said variation when said multipole aberrations include at least a decapole aberration.

7. The method of claim 1 wherein said non-circular aperture comprises a shape having an equal number of sine wave-like peaks and troughs distributed evenly around a perimeter of said aperture.

8. The method of claim 1 wherein said non-circular aperture comprises a shape having a number of square teeth distributed evenly around a perimeter of said aperture.

9. The method of claim 1 wherein said non-circular aperture comprises a regular geometric shape other than a circle.

10. The method of claim 1 wherein said adjusting said magnitude of said DC voltage comprises selecting said magnitude to be at least +200 volts.

11. In an electron beam tomography (EBT) scanner, apparatus to reduce variation in a spot size of an electron beam at a target due to multipole aberrations, said apparatus comprising:

a positive ion electrode (PIE) having a non-circular aperture specifically oriented with respect to said electron beam; and an adjustable DC voltage source to apply a magnitude of DC voltage to said PIE.

12. The apparatus of claim 11 wherein said PIE comprises a planar disk having said non-circular aperture sized to permit passage of said electron beam therethrough.

13. The apparatus of claim 11 wherein said PIE is located downstream from and substantially coaxially with an ion clearing electrode (ICE) within said EBT scanner, and wherein said ICE sweeps away positive ions in an upstream region within said EBT scanner.

14. The apparatus of claim 11 wherein a shape of said non-circular aperture is predetermined such that said shape reduces said variation due to at least one multipole aberration of said multipole aberrations when said electron beam passes through said non-circular aperture.

15. The apparatus of claim 11 wherein said non-circular aperture comprises a shape having n-fold symmetry, wherein n comprises an integer value.

16. The apparatus of claim 11 wherein said non-circular aperture comprises a shape having 5-fold symmetry to reduce said variation when said multipole aberrations comprise at least a decapole aberration.

17. The apparatus of claim 11 wherein said non-circular aperture comprises a shape having an equal number of sine wave-like peaks and troughs distributed evenly around a perimeter of said aperture.

18. The apparatus of claim 11 wherein said non-circular aperture comprises a shape having a number of square teeth distributed evenly around a perimeter of said aperture.

19. The apparatus of claim 11 wherein said non-circular aperture comprises a regular geometric shape other than a circle.

20. The apparatus of claim 11 wherein said magnitude of said DC voltage is at least +200 volts.

* * * * *